G. C. BLONDO.
CROSS HEAD CONNECTION.
APPLICATION FILED FEB. 5, 1914.
1,115,276.
Patented Oct. 27, 1914.
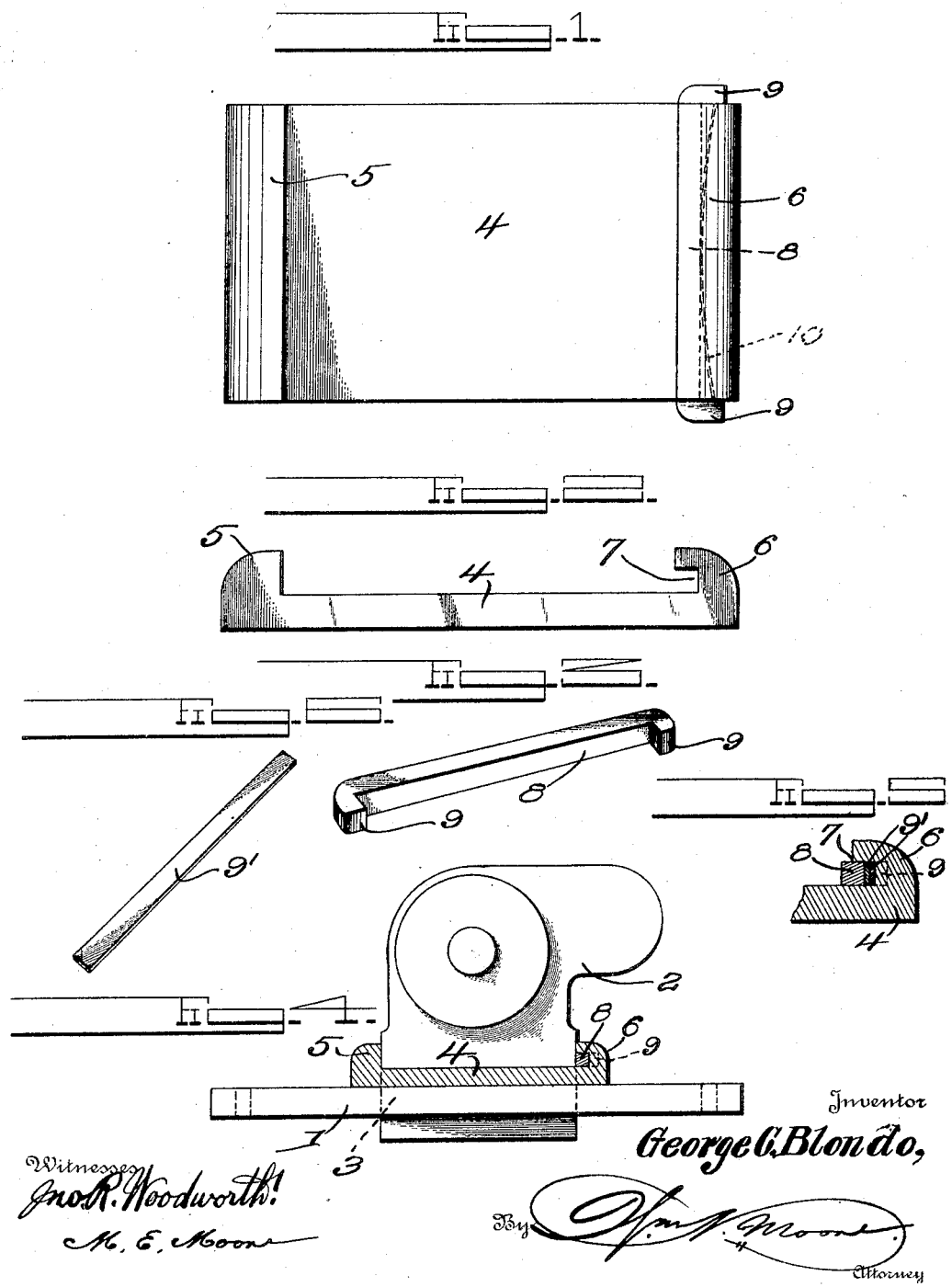
Inventor
George C. Blondo,

UNITED STATES PATENT OFFICE.

GEORGE C. BLONDO, OF FAIRBANKS, TERRITORY OF ALASKA.

CROSS-HEAD CONNECTION.

1,115,276.  Specification of Letters Patent.  Patented Oct. 27, 1914.

Application filed February 5, 1914. Serial No. 816,688.

*To all whom it may concern:*

Be it known that I, GEORGE C. BLONDO, a citizen of the United States, residing at Fairbanks, in the county of Cochise and Territory of Alaska, have invented certain new and useful Improvements in Cross-Head Connections, of which the following is a specification.

My invention relates to improvements in connections for crosshead slide gibs, pitman or like constructions; and the main object of my invention is the provision of a simple, inexpensive, durable and throughly efficient means for providing a connection which can be easily applied, which will retain the parts in proper position; and which will provide for taking up wear between the parts.

With this object in view, my invention consists of means of the character and for the purpose stated embodying novel features of construction and combination of parts, substantially as shown, described and claimed.

Figure 1 is a top plan view of the connecting plate forming the main feature of my invention. Fig. 2 represents an edge view thereof. Fig. 3 represents a perspective view of the securing pin or wedge. Fig. 4 represents a detail view showing the invention applied to a crosshead and its member for reciprocating said crosshead. Fig. 5 represents a detail sectional view showing the manner of inserting building-up or wear strips, and Fig. 6 represents a perspective view of one of the building-up strips.

In the drawings: the numeral 1 designates the crosshead, which is secured to a movable or slidable member, and fitted to said crosshead is the arm 2, formed with a recess 3, for sliding upon said crosshead. The purpose of my invention is to connect this arm to the crosshead; and my device consists of the plate 4, which fits in the recess of the arm between the arm and crosshead; and said plate at one end is formed with a shoulder 5, which engages one edge of the arm, and at its other end is formed with a shoulder 6, which engages the opposite edge of said arm. The shoulder 6 being provided with a channel or cavity 7, in which fits the wedge strip 8, having hooked ends 9 for retaining it in place with reference to the plate. From this construction it will be seen that the plate is interposed between the crosshead and arm, and that the shoulders of the plate engage opposite faces of said arm, and the wedging strip retains the arm rigidly in position between the shoulders and in proper relation to the plate and crosshead. In the event of wear between the arm and plate, I use one or more of the strips 9', which serve to take up any wear between the plate and arm, and thus provide a rigid connection which compensates for all wear or friction between the parts.

It will be understood that a device of this character may be used for many purposes, and that it will perform the function for which it is intended in a thorough and practical manner. If desired, I may use a flat-spring 10, in place of strips 9'.

I claim:

1. In combination with a sliding cross head, a pitman receiving arm fitting upon said cross head, a plate fitting between the cross head and arm and having a flat hook at one end and a recessed hook at its other end, and a wedge strip fitting in the recessed hook and bearing against one face of said arm and having a hook at each end to retain said wedge in position.

2. In combination with a sliding cross head, a pitman receiving arm fitting upon said cross head, a plate fitting between the cross head and arm and having a flat hook at one end and a recessed hook at its other end, a wedge strip fitting in the recessed hook and bearing against one face of said arm and having a hook at each end to engage said plate to retain the wedge strip in position, and means arranged between said wedge strip and recess of said hooked arm to take up wear upon said strips.

In testimony whereof I affix my signature in presence of two witnesses.

GEORGE C. BLONDO.

Witnesses:
JAMES E. BARRACS,
WILLIAM A. APPLEBY.

Copies of this patent may be obtained for five cents each, by addressing the "Commissioner of Patents, Washington, D. C."